United States Patent
Dubey

(10) Patent No.: US 8,663,382 B2
(45) Date of Patent: Mar. 4, 2014

(54) HIGH STRENGTH PHOSPHATE-BASED CEMENT HAVING LOW ALKALINITY

(75) Inventor: Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 710 days.

(21) Appl. No.: 12/909,483

(22) Filed: Oct. 21, 2010

(65) Prior Publication Data

US 2012/0100295 A1  Apr. 26, 2012

(51) Int. Cl.
*C04B 12/02* (2006.01)

(52) U.S. Cl.
USPC ........... 106/690; 106/691; 106/800; 106/801; 264/333; 427/403

(58) Field of Classification Search
USPC .................. 106/690, 691, 800, 801; 264/333; 427/403
See application file for complete search history.

(56) References Cited

U.S. PATENT DOCUMENTS

| | | |
|---|---|---|
| 2,455,758 A | 12/1948 | Greger |
| 3,510,322 A | 5/1970 | Higashi |
| 3,879,209 A | 4/1975 | Limes et al. |
| 3,960,580 A | 6/1976 | Stierli et al. |
| 4,504,555 A | 3/1985 | Prior et al. |
| 4,721,659 A | 1/1988 | Tieckelmann et al. |
| 5,002,610 A | 3/1991 | Sherif et al. |
| 5,053,212 A | 10/1991 | Constantz et al. |
| 5,178,845 A | 1/1993 | Constantz et al. |
| 5,496,399 A | 3/1996 | Ison et al. |
| 5,582,232 A | 12/1996 | Bambauer |
| 5,605,713 A | 2/1997 | Boltong |
| 5,683,496 A | 11/1997 | Ison et al. |
| 5,718,757 A | 2/1998 | Guillou et al. |
| 5,830,815 A | 11/1998 | Wagh et al. |
| 5,846,312 A | 12/1998 | Ison et al. |
| 6,053,970 A | 4/2000 | Ison et al. |
| 6,136,088 A | 10/2000 | Farrington |
| 6,204,214 B1 | 3/2001 | Singh et al. |
| 6,458,423 B1 | 10/2002 | Goodson |
| 6,561,269 B1 | 5/2003 | Brown et al. |
| 6,776,837 B2 | 8/2004 | Wagh et al. |
| 6,783,799 B1 | 8/2004 | Goodson |
| 7,045,476 B1 | 5/2006 | Lally |
| 7,062,888 B2 | 6/2006 | Alesi |
| 7,160,383 B2 | 1/2007 | Wagh et al. |
| 7,204,880 B1 | 4/2007 | Turner et al. |
| 7,429,290 B2 | 9/2008 | Lally |
| 7,491,267 B2 | 2/2009 | Francis et al. |
| 7,527,098 B2 | 5/2009 | Santra et al. |
| 7,575,630 B2 | 8/2009 | Virtanen |
| 7,595,092 B2 | 9/2009 | Huddy et al. |
| 7,699,928 B2 | 4/2010 | Paul, Jr. |
| 2004/0132608 A1 | 7/2004 | Lally |
| 2005/0160944 A1 | 7/2005 | Wagh et al. |
| 2009/0053949 A1 | 2/2009 | Achten et al. |
| 2010/0101457 A1 | 4/2010 | Surace et al. |

FOREIGN PATENT DOCUMENTS

| | | |
|---|---|---|
| CN | 101381219 A | 3/2009 |
| WO | WO 92/04293 | 3/1992 |

*Primary Examiner* — Paul Marcantoni

(74) *Attorney, Agent, or Firm* — Greer, Burns & Crain, Ltd.; Pradip Sahu; Philip T. Petti

(57) ABSTRACT

A mixture for making a high strength phosphate cement includes monopotassium phosphate, a Group IIA metal oxide in amounts of about 20 to about 100 parts per 100 parts of the monopotassium phosphate and monocalcium orthophosphate in amounts of from about 3 to about 30 parts per 100 parts of the monopotassium phosphate. Products made from the phosphate cement have a pH of less than about 9 and the product develops a compressive strength greater than 2000 psi in 24 hours.

20 Claims, 4 Drawing Sheets ion the pH of the hardened material. The hardened cement is optionally prepared to have a pH in the range of about 7.0 to 9.0, preferably from about 7.0 to about 8.0. Better control of the pH leads to less corrosiveness, better compatibility with other building materials and makes the cement more user friendly.

HIGH STRENGTH PHOSPHATE-BASED CEMENT HAVING LOW ALKALINITY

BACKGROUND OF THE INVENTION

Cements are commonly used as building materials for many reasons. They can be shaped or molded into virtually any form. A liquid cement slurry can be cast into molds to make products such as concrete blocks. The slurry is also useful to form poured cement floors or walls. Flooring compositions are known that are self-leveling and develop high strength over time.

A typical composition for a cementitious binding material includes a silicate cement, such as a Portland cement, sand or other aggregate, water and additives that are specific to the intended use. If the use is a poured flooring, for example, additives may include fluidizing agents to make the floor self-leveling. Set retarders may be provided to give a long open time for working the surface to a smooth, strong finish. Gypsum is optionally added to improve green strength of the setting mixture.

Addition of water to cementitious materials initiates chemical hydration reactions. In an exothermic reaction, water is chemically bound to the cementitious materials, forming crystals whose shape is dependent on the starting material. Often a variety of cementitious materials is used to produce a composition having crystals of a particular shape or that develop certain strength characteristics. As the hydrated crystals form, they become an interwoven crystal matrix. The strength of the crystal matrix depends on how easily the crystals separate from each other.

Slow drying cements increase the cost and time needed for construction. Some sub-contractors are unable to work after, for example, a floor is poured, because it has insufficient strength to bear the weight of the workers and their equipment. There is a need in the art for a cementitious composition that hardens quickly and develops strength quickly.

Another drawback of most cementitious compositions is that they are highly caustic. Highly caustic cement slurries are irritating if brought into contact with skin. Then can also cause degradation of adhesives for tile or carpet. There is a further need for a cementitious composition that is lower in pH so as to be more compatible with people and products that come in contact with it.

SUMMARY OF THE INVENTION

A mixture for making a high strength phosphate cement includes monopotassium phosphate, a Group IIA metal oxide in amounts of about 20 to about 100 parts per 100 parts of the monopotassium phosphate and monocalcium orthophosphate in amounts of from about 3 to about 30 parts per 100 parts of the monopotassium phosphate. Products made from the phosphate cement have a pH of less than about 9 and the product has a compressive strength greater than 13.5 megapascals (2000 psi) in 24 hours.

The phosphate-based mixture of this invention has extremely rapid setting behavior when mixed with water. Setting time of the cement can be varied from instantaneous setting to several hours from the time of mixing by varying the raw material proportions. This versatility in setting time makes this a very useful mixture in many applications.

Hardness of the cement is also varied by selecting the proportions of the raw materials. Cement mixtures have been prepared that developed a compressive strength in excess of (41 megapascals (6000 psi) within 2 hours of mixing the raw materials.

Another advantage of the present composition is the ability to tailor the pH of the hardened material. The hardened cement is optionally prepared to have a pH in the range of about 7.0 to 9.0, preferably from about 7.0 to about 8.0. Better control of the pH leads to less corrosiveness, better compatibility with other building materials and makes the cement more user friendly.

DETAILED DESCRIPTION OF THE INVENTION

Figure 1:
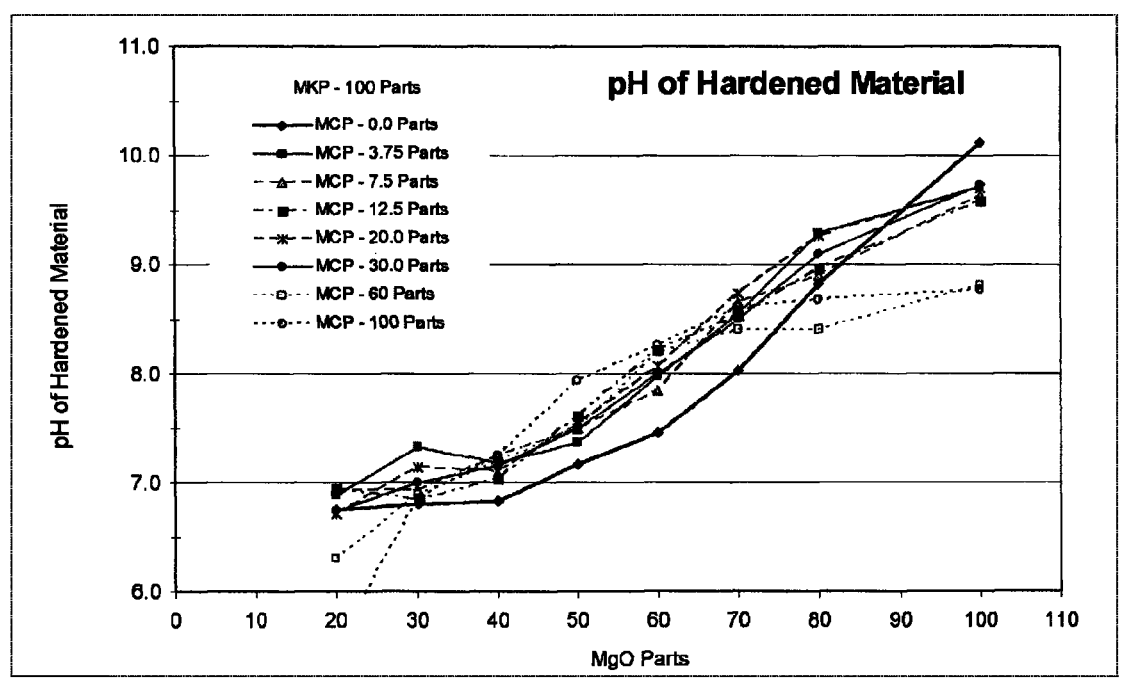
FIG. 1 is a graph of the data in Table 1 showing the influence of MCP and MgO amounts on the pH of the dried cement.

This invention relates to a dry, phosphate-based mixture. As discussed herein, the term "mixture" is intended to refer to the dry mixture. The binder composition obtained by mixing the mixture with water is referred to as "cement." Unless otherwise specified, all percentages, ratios or amounts referred to as "parts" are based on the weight of the component or combination of components. Basic components of a phosphate-based mixture include monopotassium phosphate ("MKP"), a Group IIA metal oxide and monocalcium orthophosphate ("MCP").

One basic component of the phosphate-based cement mixture is monopotassium phosphate. An example of suitable MKP is available from ICL Performance Products LP (St. Louis, Mo.).

The metal oxide is preferably magnesium oxide ("MgO" or magnesia). Magnesium oxide is generally obtained by burning magnesium compounds and the MgO is produced in three forms: light-burned, hard-burned and dead-burned. Light-burned MgO is the most active. It is burned at temperatures of from 700° C. to about 1000° C. Hard-burned is prepared at temperatures ranging from 1000° C. to about 1500° C. Dead-burned or overburned MgO is prepared under the most severe process conditions and has the least activity. This refractory grade magnesia is calcined at temperatures above 1500° C. Hard-burned and dead-burned magnesium oxide grades are most useful in the phosphate-based cement mixture. A suggested source of MgO is Martin Marietta Magnesia Specialties (Baltimore, Md.).

In some embodiments of the mixture, the metal oxide is used in amounts of from 20 parts to about 100 parts metal oxide per 100 parts MKP or in amounts of less than 80 parts metal oxide per 100 parts MKP. Some embodiments utilize the metal oxide in amounts of from about 40 parts to about 80 parts on the same basis. Optionally, the metal oxide ranges from about 50 parts to about 70 parts per 100 parts MKP.

Another component of the mixture is monocalcium orthophosphate ("MCP"). In some embodiments, the MCP is used in amounts of about 3 to about 30 parts per 100 parts of MKP. Some other embodiments use MCP in amounts of about 7.5 to about 30 parts based on 100 parts MKP. Some other embodiments use MCP in amounts of about 12.5 to about 20 parts based on 100 parts MKP. An example of a source for MCP is ICL Performance Products LP (St. Louis, Mo.).

The mixture optionally includes one or more inorganic minerals or filler additives such as fly ash, silica fume, pumice, diatomaceous earth, perlite, metakaolin, slag, crushed silica, gypsum, metal carbonates, talc, mica, sand, hollow glass microspheres, hollow ceramic microspheres, hollow plastic microspheres or combinations thereof. It is contemplated that the mineral or filler additives be used in any form available. By way of examples, fly ash may be used as Class C or Class F fly ash; gypsum may be present in the dihydrate, hemihydrate or anhydrite forms; or perlite may be in its natural form or expanded. When present in the composition, the mineral or filler additives are present in amounts of up to about 400 parts by weight based on 100 parts of MKP plus MgO plus MCP combined. When fly ash is the mineral or filler additive, it may be used to displace any of the main components of the cement mixture, including the MKP, the metal oxide or the MCP in amounts up to four parts of fly ash, based on 100 parts of MKP plus MgO plus MCP combined, while maintaining satisfactory mechanical performance.

Density of the set and dried cement may be varied from about 160 to about 2400 $Kg/m^3$ (10 to about 150 pounds per cubic foot). Some embodiments of the product have densities of about 960 to about 1600 $Kg/m^3$ (60 to about 100 pounds per cubic foot) or from about 1120 to about 1440 $Kg/m^3$ (70 to about 90 pounds per cubic foot). Any of several methods may be used to vary the density, including the addition of foam or the use of lightweight fillers. Lightweight fillers optionally include expanded perlite, hollow microspheres and combinations thereof. When foam is used to reduce the density, a foaming agent is optionally added to the cement mixture prior to mixing, or a pregenerated foam is optionally combined with the blended cement mixture.

Reinforcing materials are optionally used on the surface of a product, such as a panel core, to add strength. One option is to add discrete fibers to the fluid cement used to make the panel core. Examples of suitable discrete fibers include chopped E-glass fibers, basalt fibers, alkali-resistant glass fibers, ceramic fibers, polymeric fibers such as PVA; polypropylene, polyethylene, nylon, cellulose fibers, metal fibers, and combinations thereof. Another option is to add continuous fibers to the fluid cement. Examples of continuous reinforcements include fiberglass mesh, glass mat, ceramic fibers, Kevlar fibers, polypropylene, polyethylene, polyester, polyvinyl chloride, nylon fibers or combinations thereof. Any of the continuous or discrete reinforcements is also useful on the surface of a panel made with the cement. Use of any combination of reinforcements is also contemplated, such as the use of discrete fibers in the core and continuous reinforcements on the surface of a building panel.

Another aspect of the cement slurry is the pH. Some embodiments of the cement have a pH of less than about 9. A number of preferred embodiments also have a pH less than about 8. Another useful pH range is from about 7.0 to about 8.5. The proportions of MKP, MgO and MCP are varied to obtain a satisfactory pH. To lower the pH, the ratio of MgO is lowered relative to the amounts of MKP and MCP.

Products obtained from this product are also high in strength. In some embodiments, the cement is used to make a self-leveling flooring product having a compressive strength greater than 10 megapascals (1500 psi) obtained in 24 hours or 13.5 megapascals (2000 psi) in 24 hours. In some embodiments of the self-leveling flooring product, compressive strength greater than 20 megapascals (3000 psi) is obtained in 24 hours. Compressive strength greater than 20 megapascals (3000 psi) is obtained within two hours in a number of embodiments. Rapid set and strength development is advantageous in flooring materials, for example, so that contractors can continue their work soon after pouring the cement. As used in this description, "strength" is a measure of the material strength as a whole. This is to differentiate it from surface hardness, which does not necessarily describe a substance that is strong all the way through.

The mixture is a dry powder that is combined with water to make a flowable cementitious slurry. Water is used in amounts sufficient to make a consistency appropriate to the intended use. In some embodiments water is added to make a flowable slurry. Other uses require a slurry that is sprayable. When flooring products are being prepared, it is often important to have a self-leveling slurry. Generally the self-leveling slurry requires more water than a finished floor, however, increased flowability is also achievable by the addition of dispersants or other chemicals known for this purpose. In some embodiments water is used in amounts of about 5 to about 45 parts water per 100 parts of dry mixture. Other embodiments utilize water in the range of about 7.5 to about 40 parts per 100 parts of dry mixture. In still other embodiments, water is added in amounts of about 10 to about 30 parts per 100 parts of dry mixture.

Water used to make the cement should be as pure as practical for best control of the properties of both the slurry and the set product. Salts and organic compounds are well known to modify the set time of the cement, varying widely from accelerators to set inhibitors. Some impurities lead to irregularities in the structure as the interlocking crystal matrix forms, reducing the strength of the set product. Product strength and consistency is thus enhanced by the use of water that is as contaminant-free as practical.

The components of the cementitious slurry are combinable in any manner as is known in the art. In some embodiments, all dry components are combined together and bagged for sale as the dry mixture. At a job site, the dry mixture is mixed with water to form the slurry. Another method of making a slurry is to add the combined dry components in a mixer. Some dry components may also be added to the water separately from other components, either sequentially or concurrently. Very rapid hardening can be achieved with some embodiments of this invention. Care should be taken that combining and mixing of the components occurs sufficiently rapidly that the slurry does not set prior to being shaped into the product.

A variety of products can be made using the phosphate-based cement of this invention, including, but not limited to structural panels, roofing underlayment, pourable underlayments, roofing tiles, exterior wall siding elements, structural shapes with solid or hollow sections, patching materials, thin-set mortar or grout, coatings or shotcreting for slope stabilization.

When used to make structural panels, the cement slurry is optionally poured into a mold or panels are made using a continuous casting process by any method known in the art. Cementitious panels are used for flooring, roofing and sheathing applications. The panels are optionally reinforced with discrete fibers, such as chopped E-glass fibers, basalt fibers, ceramic fibers, polymeric fibers, metal fibers, etc. Another option is the use of continuous reinforcements such as fiberglass mesh, glass mat, basalt mat, meshes, scrims and non-woven mats made from organic or inorganic materials such as ceramic fibers, Kevlar fibers, polypropylene, polyethylene, polyester, polyvinyl chloride, nylon and the like. The cement slurry flows from the mixer to be deposited onto a movable surface, either directly onto the surface or onto a facing. The optional facing is paper, fiberglass, scrim, plastic sheeting, or other known facing materials. Any of the reinforcing materials may be on the surface of the panel, in the core of the panel or both. It is contemplated that any of these reinforcing materials be combined with any other of the reinforcing materials, that discrete fibers and continuous mats be used together or that discrete fibers are present in the core of the panel and a continuous fiber mat is on the panel surface.

Another embodiment of the invention is a stressed-skin panel. These panels are useful as interior or exterior backerboard applications, as wall panels, as exterior sheathing panels, as roofing underlayments. Stressed-skin panels according to the present invention can be made using skin reinforcing materials on the cement. Examples of the skin reinforcing materials include, but are not limited to fiberglass mesh, glass mat, basalt mat and meshes, non-woven mats made from other inorganic and organic materials such as ceramic fibers, Kevlar fibers, polypropylene, polyethylene, polyvinyl chloride, ceramic fibers, polymeric fibers such as polyvinyl alcohol, polypropylene, polyethylene, nylon, cellulose fibers, metal fibers and the like. These panels are also useful as roofing underlayments, armor panels, insulation panels, ceiling tiles and panels.

Flooring underlayments are prepared by pouring the cement directly onto the space which will be occupied by the floor. Underlayments can be of the self-leveling type, or can be poured and finished using conventional finishing tools. Self-leveling cements frequently are less viscous than other underlayments due to the addition of dispersants or other additives that improve flowability. Additional water can also be used to make the underlayment flowable, but use of too much water can also reduce the strength of the product. Pourable compositions are also useful as a capping underlayment over slabs of concrete and other substances.

Some embodiments of this invention are shapeable but are not self-leveling. These embodiments include, but are not limited to, repair and patching materials, such as for roads, thin-set mortars, grouting materials and joint compounds for wallboard, cement board and other applications. The phosphate-based cement is also contemplated for use as a coating, including cementitious coatings, sprayable coatings and shotcreting for slope stabilization and tunnel linings. This composition can be used in any application where a strong, fast set is and rapid early strength are advantageous.

Other embodiments of this invention are roofing tiles, exterior wall siding elements, wall panels, flooring panels, roofing panels, structural shapes with solid or hollow sections, synthetic ceramic tiles and synthetic stones.

EXAMPLE

A series of compositions were prepared to test the relative amounts of the acid phosphate salt, metal oxide and monocalcium orthophosphate binders in the mixture. Dead-burned magnesium oxide was selected as the metal oxide and monopotassium phosphate is an example of the acid phosphate salt. In addition the amounts of MKP, MgO and MCP shown in Table I, each cement sample also included 360 grams of a filler, known as FILLITE 500®, 450 grams of water and 12 grams of boric acid. In Table I, the column labeled "24 Hr." is the 24 hour compressive strength in psi (newtons/square centimeter), "7 Day Wet" is the seven day wet compressive strength in psi (newtons/square centimeter) and "7 Day Dry" is the seven day compressive strength in psi (newtons/square centimeter). The pH reported is that of the hardened product material.

TABLE I

| Sample | MKP | MCP | MgO | Total Binders | MgO/MKP Ratio | pH | 24 Hr. | 7 Day Wet | 7 Day Dry |
|---|---|---|---|---|---|---|---|---|---|
| 1-1 | 100 | 0 | 20 | 120 | 0.2 | 6.8 | 126 (87) | 14 (10) | 61 (42) |
| 1-2 | 100 | 0 | 30 | 130 | 0.3 | 6.8 | 457 (315) | 194 (134) | 383 (264) |
| 1-3 | 100 | 0 | 40 | 140 | 0.4 | 6.8 | 502 (346) | 412 (284) | 469 (323) |
| 1-4 | 100 | 0 | 50 | 150 | 0.5 | 7.2 | 1796 (1238) | 1734 (1196) | 2185 (1507) |
| 1-5 | 100 | 0 | 60 | 160 | 0.6 | 7.5 | 2536 (1749) | 2608 (1798) | 2927 (2028) |
| 1-6 | 100 | 0 | 70 | 170 | 0.7 | 8.0 | 2530 (1744) | 1620 (1117) | 2911 (2007) |
| 1-7 | 100 | 0 | 80 | 180 | 0.8 | 8.8 | 3091 (2131) | 2664 (1837) | 2785 (1920) |
| 1-8 | 100 | 0 | 100 | 200 | 1.0 | 10.1 | 3171 (2186) | 2993 (2064) | 3006 (2073) |
| 2-1 | 100 | 3.75 | 20 | 123.75 | 0.2 | 6.9 | 66 (46) | 8 (6) | 45 (31) |
| 2-2 | 100 | 3.75 | 30 | 133.75 | 0.3 | 7.3 | 455 (314) | 388 (268) | 733 (505) |
| 2-3 | 100 | 3.75 | 40 | 143.75 | 0.4 | 7.3 | 1969 (1358) | 3242 (2235) | 3487 (2404) |
| 2-4 | 100 | 3.75 | 50 | 153.75 | 0.5 | 7.4 | 2879 (1905) | 3061 (2110) | 3312 (2284) |
| 2-5 | 100 | 3.75 | 60 | 163.75 | 0.6 | 8.0 | 3935 (2713) | 3473 (2395) | 3602 (2483) |
| 2-6 | 100 | 3.75 | 70 | 173.75 | 0.7 | 8.5 | 3659 (2523) | 3439 (2371) | 3437 (2370) |
| 2-7 | 100 | 3.75 | 80 | 183.75 | 0.8 | 9.3 | 3342 (2403) | 3505 (2417) | 3581 (2469) |
| 2-8 | 100 | 3.75 | 100 | 203.75 | 1.0 | 9.7 | 3556 (2452) | 3692 (2546) | 3620 (2496) |
| 3-1 | 100 | 7.5 | 20 | 127.5 | 0.2 | 6.9 | 44 (30) | 11 (8) | 42 (29) |
| 3-2 | 100 | 7.5 | 30 | 137.5 | 0.3 | 6.9 | 582 (401) | 727 (501) | 908 (626) |
| 3-3 | 100 | 7.5 | 40 | 147.5 | 0.4 | 7.3 | 1501 (1035) | 2407 (1660) | 2618 (1805) |
| 3-4 | 100 | 7.5 | 50 | 157.5 | 0.5 | 7.5 | 2645 (1824) | 3472 (2394) | 2825 (1948) |
| 3-5 | 100 | 7.5 | 60 | 167.5 | 0.6 | 7.9 | 3378 (2329) | 3318 (2288) | 3039 (2095) |
| 3-6 | 100 | 7.5 | 70 | 177.5 | 0.7 | 8.7 | 3256 (2245) | 3276 (2259) | 3605 (2486) |
| 3-7 | 100 | 7.5 | 80 | 187.5 | 0.8 | 8.9 | 3076 (2121) | 3245 (2237) | 3331 (2297) |
| 3-8 | 100 | 7.5 | 100 | 207.5 | 1.0 | 9.6 | 2632 (1815) | 2635 (1818) | 2865 (1975) |
| 4-1 | 100 | 12.5 | 20 | 132.5 | 0.2 | 7.0 | 105 (72) | 0 (0) | 464 (320) |
| 4-2 | 100 | 12.5 | 30 | 142.5 | 0.3 | 6.8 | 617 (425) | 1348 (929) | 2046 (1411) |
| 4-3 | 100 | 12.5 | 40 | 152.5 | 0.4 | 7.0 | 1547 (1067) | 3144 (2168) | 3231 (2228) |
| 4-4 | 100 | 12.5 | 50 | 162.5 | 0.5 | 7.6 | 2704 (1864) | 3280 (2261) | 3732 (2573) |
| 4-5 | 100 | 12.5 | 60 | 172.5 | 0.6 | 8.2 | 3448 (2377) | 3985 (2748) | 4518 (3115) |
| 4-6 | 100 | 12.5 | 70 | 182.5 | 0.7 | 8.5 | 3031 (2090) | 3405 (2348) | 3670 (2530) |
| 4-7 | 100 | 12.5 | 80 | 192.5 | 0.8 | 9.0 | 3405 (2348) | 3461 (2386) | 3340 (2303) |
| 4-8 | 100 | 12.5 | 100 | 212.5 | 1.0 | 9.6 | 2988 (2060) | 2863 (1974) | 3460 (2386) |
| 5-1 | 100 | 20 | 20 | 140.0 | 0.2 | 6.7 | 0 (0) | 0 (0) | 1559 (1075) |
| 5-2 | 100 | 20 | 30 | 150.0 | 0.3 | 7.1 | 501 (345) | 1230 (848) | 1366 (921) |
| 5-3 | 100 | 20 | 40 | 260.0 | 0.4 | 7.1 | 1529 (1054) | 2404 (1657) | 3202 (2208) |

TABLE I-continued

| Sample | MKP | MCP | MgO | Total Binders | MgO/MKP Ratio | pH | 24 Hr. | 7 Day Wet | 7 Day Dry |
|---|---|---|---|---|---|---|---|---|---|
| 5-4 | 100 | 20 | 50 | 270 | 0.5 | 7.5 | 2500 (1724) | 4320 (2797) | 3759 (2592) |
| 5-5 | 100 | 20 | 60 | 280 | 0.6 | 8.1 | 3780 (2606) | 5252 (3521) | 4405 (3037) |
| 5-6 | 100 | 20 | 70 | 290 | 0.7 | 8.7 | 3932 (2711) | 4805 (3313) | 4777 (3294) |
| 5-7 | 100 | 20 | 80 | 300 | 0.8 | 9.3 | 3866 (1976) | 5350 (3689) | 4508 (3108) |
| 5-8 | 100 | 20 | 100 | 320 | 1.0 | 9.7 | 3605 (2486) | 3643 (2506) | 3874 (2671) |
| 6-1 | 100 | 30 | 20 | 150 | 0.2 | 6.7 | 124 (85) | 0 (0) | 0 (0) |
| 6-2 | 100 | 30 | 30 | 160 | 0.3 | 7.0 | 601 (414) | 1228 (847) | 1506 (1038) |
| 6-3 | 100 | 30 | 40 | 170 | 0.4 | 7.2 | 1212 (836) | 2803 (1932) | 3263 (2250) |
| 6-4 | 100 | 30 | 50 | 180 | 0.5 | 7.5 | 2499 (1723) | 3304 (2278) | 4040 (2785) |
| 6-5 | 100 | 30 | 60 | 190 | 0.6 | 8.0 | 2939 (2026) | 4297 (2963) | 4197 (2894) |
| 6-6 | 100 | 30 | 70 | 200 | 0.7 | 8.5 | 3583 (2470) | 4311 (2972) | 4526 (3121) |
| 6-7 | 100 | 30 | 80 | 210 | 0.8 | 9.1 | 3487 (2404) | 3829 (2640) | 4435 (3058) |
| 6-8 | 100 | 30 | 100 | 230 | 1.0 | 9.7 | 3818 (2632) | 3966 (2734) | 3803 (2622) |
| 7-1 | 100 | 60 | 20 | 180 | 0.2 | 6.3 | 81 (56) | 183 (126) | 226 (156) |
| 7-2 | 100 | 60 | 30 | 190 | 0.3 | 6.9 | 271 (187) | 351 (242) | 367 (253) |
| 7-3 | 100 | 60 | 40 | 200 | 0.4 | 7.2 | 270 (186) | 1365 (941) | 1589 (1096) |
| 7-4 | 100 | 60 | 50 | 210 | 0.5 | 7.5 | 899 (620) | 3319 (2288) | 2833 (1953) |
| 7-5 | 100 | 60 | 60 | 220 | 0.6 | 8.2 | 2494 (1720) | 3015 (2079) | 3027 (2087) |
| 7-6 | 100 | 60 | 70 | 230 | 0.7 | 8.4 | 4180 (2882) | 3889 (2681) | 3048 (2102) |
| 7-7 | 100 | 60 | 80 | 240 | 0.8 | 8.4 | 3902 (2690) | 3559 (2454) | 3248 (2239) |
| 7-8 | 100 | 60 | 100 | 260 | 1.0 | 8.8 | 2351 (1621) | 3432 (2366) | 3394 (2340) |
| 8-1 | 100 | 100 | 20 | 220 | 0.2 | 5.5 | 15 (10) | 179 (123) | 126 (87) |
| 8-2 | 100 | 100 | 30 | 230 | 0.3 | 6.9 | 335 (231) | 320 (221) | 361 (249) |
| 8-3 | 100 | 100 | 40 | 240 | 0.4 | 7.3 | 351 (242) | 1232 (849) | 868 (598) |
| 8-4 | 100 | 100 | 50 | 250 | 0.5 | 7.9 | 500 (345) | 2051 (1414) | 1707 (1177) |
| 8-5 | 100 | 100 | 60 | 260 | 0.6 | 8.3 | 415 (286) | 2629 (1813) | 2802 (1932) |
| 8-6 | 100 | 100 | 70 | 270 | 0.7 | 8.6 | 365 (252) | 2618 (1805) | 2281 (1573) |
| 8-7 | 100 | 100 | 80 | 280 | 0.8 | 8.6 | 358 (247) | 2708 (1867) | 2224 (1533) |
| 8-8 | 100 | 100 | 100 | 300 | 1.0 | 8.8 | 1425 (983) | 2338 (1612) | 1648 (1136) |

FIGS. 1-4 show the effects of varying the ratios of MCP, MKP and MgO in a phosphate-based cement. In FIG. 1, pH of the hardened material is reported. At lower ratios of MgO, the pH generally increases with the amount of MCP. However, between 70 and 80 parts MgO, the highest pH is produced at the lowest dosage of MCP.

Figure 2:
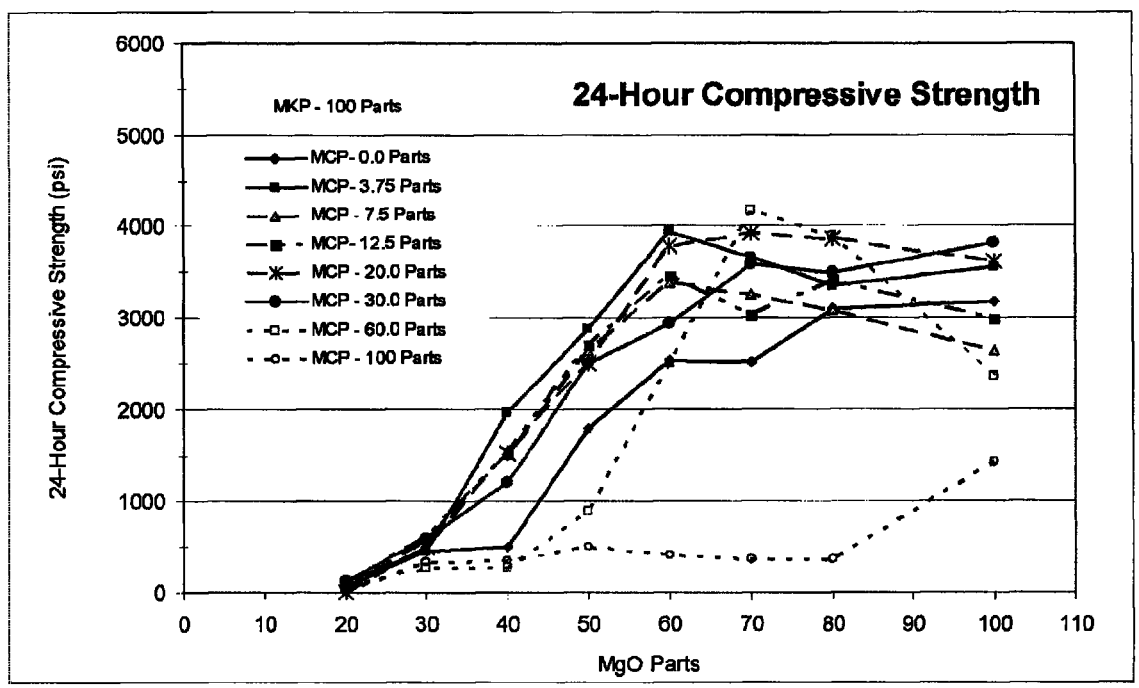
FIG. 2 is a graph of the data of Table 1 showing the influence of MCP and MgO amounts on the 24-Hour Compressive Strength.
Figure 3:
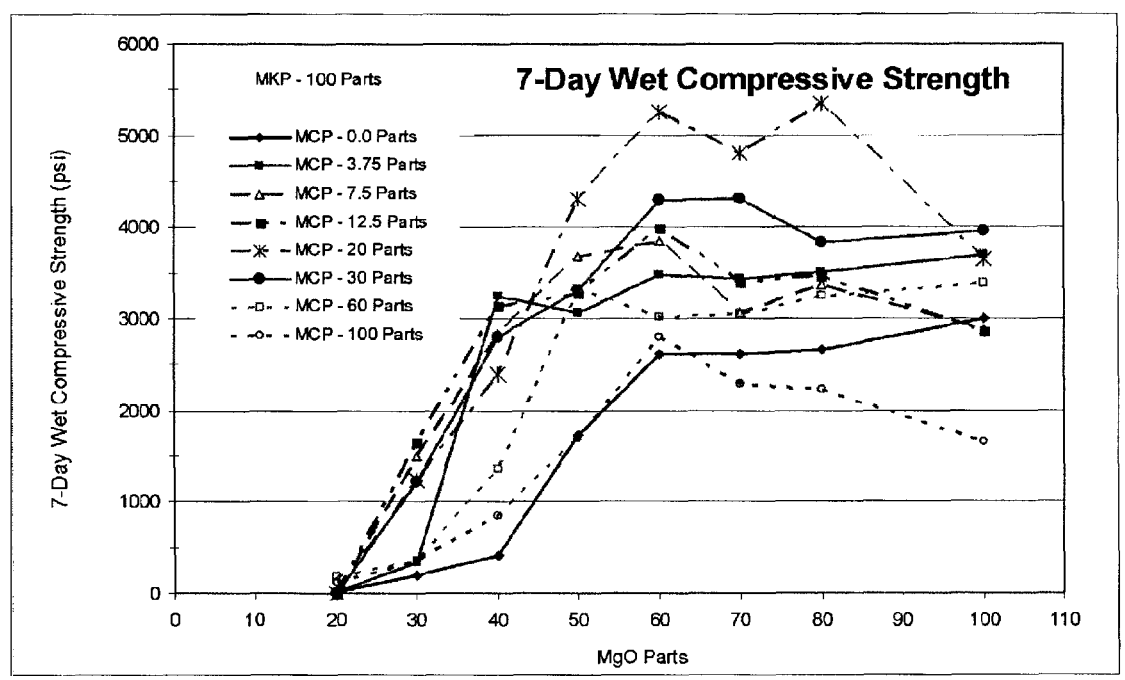
FIG. 3 is a graph of the data in Table 1 showing the influence of MCP and MgO amounts on the 7-Day Wet Compressive Strength.
Figure 4:
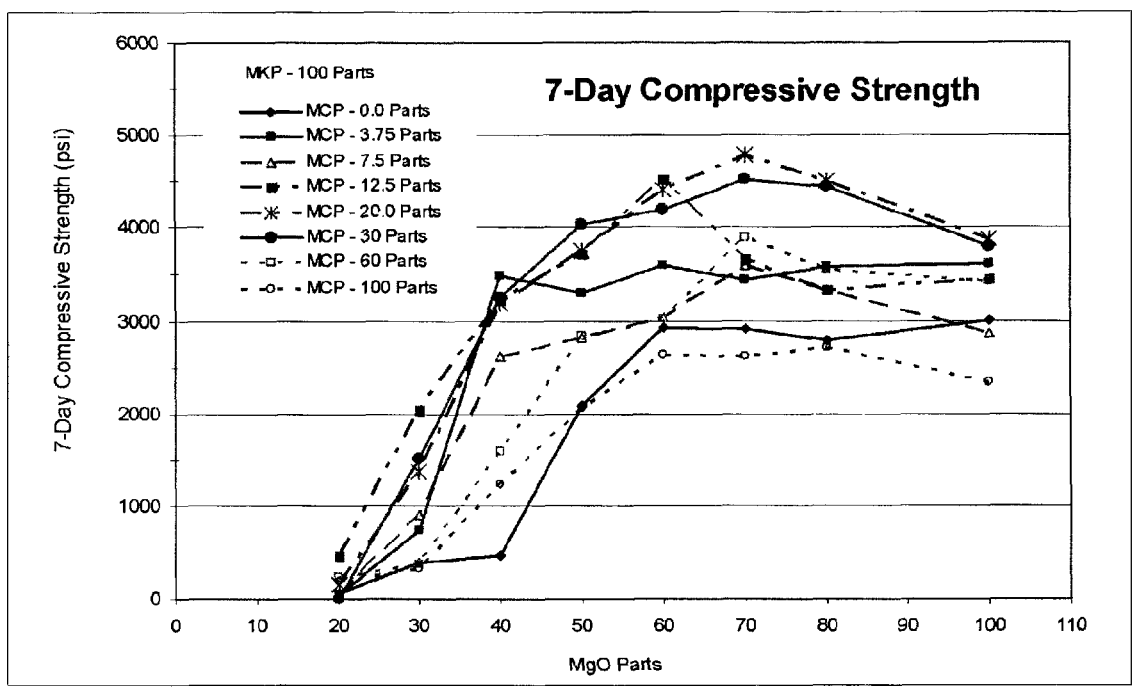
FIG. 4 is a graph of the data in Table 1 showing the influence of MCP and MgO amounts on the 7-Day Compressive Strength.

The 24-Hour Compressive Strength is summarized in FIG. 2. At 0 MCP and the highest doses of MCP, the compressive strength was clearly very low. Intermediate dosages of MCP, such as 3.75 through 30 parts MCP per 100 parts MKS, produced higher strength at MgO levels less than 60 parts MgO per 100 parts MKP.

Similarly, the 7 Day Wet and Dry Compressive Strength is highest at intermediate values of MCP when viewed over the entire range of MgO levels. Thus, the results of these experiments support the claimed ranges of MCP and MgO at constant levels of MKP.

While a particular embodiment of the phosphorous-based cement has been shown and described, it will be appreciated by those skilled in the art that elements of particular embodiments may be interchanged with those of other embodiments. These and other changes and modifications may be made thereto without departing from the invention in its broader aspects and as set forth in the following claims.

What is claimed is:

1. A phosphate mixture for making a high strength cement comprising:
    monopotassium phosphate;
    a Group IIA metal oxide in amounts of about 20 to about 100 parts per 100 parts of said monopotassium phosphate; and
    mono calcium orthophosphate in amounts of from about 3 to about 30 parts per 100 parts of said monopotassium phosphate;
    wherein the proportions of monopotassium phosphate, Group IIA metal oxide and monocalcium orthophosphate are selected so that the set product has a pH of less than about 9 and the set product has a compressive strength greater than 13.5 megapascals (2000 psi) in 24 hours.

2. The phosphate mixture of claim 1 wherein the set product has a compressive strength of 20 megapascals (3000 psi) in 24 hours.

3. The phosphate mixture of claim 1 wherein the pH of said set product is less than about 8.

4. The phosphate mixture of claim 1 wherein said Group IIA metal is magnesium.

5. The phosphate mixture of claim 4 wherein said magnesium oxide is hard-burned or dead-burned magnesium oxide.

6. The phosphate cement mixture of claim 1 further comprising a filler selected from the group consisting of sand, hollow glass microspheres, hollow ceramic microspheres, hollow plastic microspheres, pumice, expanded perlite, diatomaceous earth and combinations thereof.

7. The phosphate mixture of claim 1, wherein the density of the set product is from about 160 to about 2400 Kg/m$^3$ (10 to about 150 lb/ft$^3$).

8. The phosphate mixture of claim 7, wherein the density of the set product is from about 960 to about 1600 Kg/m$^3$ (60 to about 100 lb/ft$^3$).

9. The phosphate mixture of claim 8, wherein the density of the set product is from about 1120 to about 1440 Kg/m$^3$ (70 to 90 lb/ft$^3$).

10. The phosphate mixture composition of claim 1 further comprising discrete reinforcing fibers.

11. The phosphate mixture of claim 1 further comprising continuous reinforcing material.

12. The phosphate mixture of claim 11, wherein said continuous reinforcing material is selected from the group consisting of fiberglass mesh, glass mat, basalt mat, meshes, non-woven mats and combinations thereof.

13. The phosphate cement composition of claim 11, wherein said continuous reinforcing material in either on the surface of the cement or embedded within the cement.

14. The phosphate cement of claim 1 wherein said cement develops a compressive strength greater than 20 megapascals (3000 psi) in 24 hours or less.

15. A phosphate-based cement comprising:
   the composition of claim 1; and
   water, which have been combined to make a flowable slurry.

16. A method of making a cementitious product comprising:
   obtaining the slurry of claim 15;
   shaping the slurry to form a cementitious product; and
   allowing the slurry to harden.

17. The method of claim 16 wherein said shaping step further comprises pouring, spreading, spraying or casting the slurry.

18. The method of claim 16 wherein said shaping step further comprises forming a flooring product.

19. The method of claim 16 wherein said shaping step further comprises forming a panel product.

20. The method of claim 16 wherein said shaping step further comprises forming a coating product.

\* \* \* \* \*